United States Patent [19]
Shogren

[11] 3,912,392
[45] Oct. 14, 1975

[54] SHORT FOCAL LENGTH OPTICAL SCANNING SYSTEM
[75] Inventor: David K. Shogren, Ontario, N.Y.
[73] Assignee: Xerox Corporation, Stamford, Conn.
[22] Filed: Dec. 26, 1973
[21] Appl. No.: 427,599

[52] U.S. Cl. .................................. 355/66; 355/8
[51] Int. Cl.² ........................................ G03B 27/70
[58] Field of Search ............... 355/46, 50, 52, 66, 8

[56] References Cited
UNITED STATES PATENTS
3,592,542  7/1971  Kaufer .................................. 355/50
3,655,284  4/1972  Agliata ................................. 355/50

FOREIGN PATENTS OR APPLICATIONS
152,068  12/1937  Austria ................................. 355/51

Primary Examiner—John M. Horan
Attorney, Agent, or Firm—Robert J. Bird

[57] ABSTRACT

A strip lens arrangement in which each lens element is a half-lens with an associated mirror to fold the optical axis back through the lens. The mirror is a roof mirror providing a 180° rotation of the image which, when added to the 180° image rotation provided by the lens, results in an upright ordered image.

7 Claims, 3 Drawing Figures

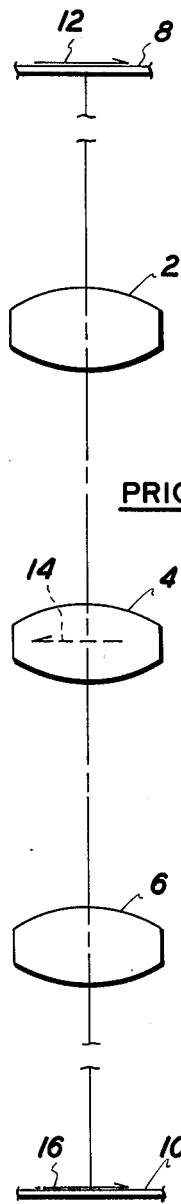
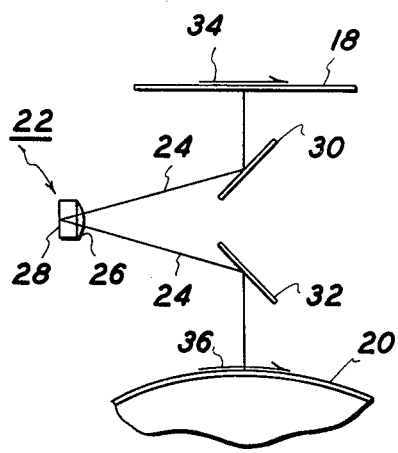
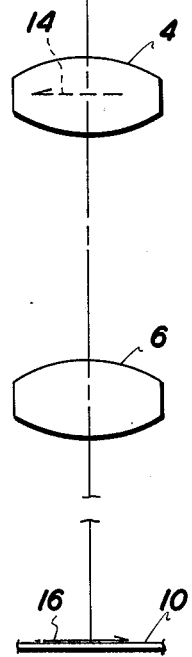
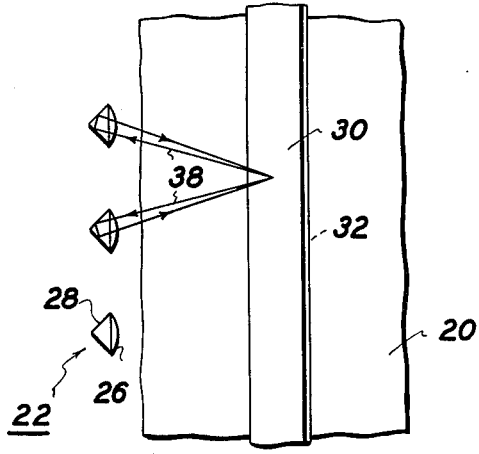
FIG. 1 PRIOR ART
FIG. 2
FIG. 3

SHORT FOCAL LENGTH OPTICAL SCANNING SYSTEM

BACKGROUND OF THE INVENTION

The present invention relates to an optical imaging system and more particularly to an optical scanning system of very short focal length that is useful for transmitting images of an original document onto a photosensitive surface on which a wrong-reading upright image of information on the document is formed.

Generally, electrostatic photocopying machines are of two types with respect to image geometry. In one type, an image of the original is projected directly upon a photosensitive surface and processed to its final permanent form on the same surface. In this type of system, the projected image must be a right-reading copy of the original. In the second type of photocopying system, an image of the original is similarly projected onto a photosensitive surface where it is developed and then transferred to a final support material while the photosensitive surface itself is reused indefinitely. Because of the additional image transfer step, the image projected onto the photosensitive surface in such a system is a wrong-reading or mirror image of the original.

One technique which has been developed for the projection of optical images in a photocopying environment is by the use of strip lenses. Such lenses are disclosed for example in U.S. Pat. No. 3,584,950 to Gundlach. Strip lenses in general consist of a first row or other mosaic array of short focal length objective lenses and a second identical array of erector lenses. Between these arrays of objectives and erector lenses, a third similar array of field lenses is required. Each of the objective lens elements forms an inverted-reverted image of the original object plane at the plane of the field lenses. This intermediate image is reimaged and erected by the erector lenses so that the final image has the same rotation as the original object. The intermediate field lenses are necessary to refract light into the field of view of the erector lenses.

The advantage of the strip lens over conventional optics for use as a scanner in photocopying is the great reduction in the optical path length. This is particularly true when a wide field is to be covered, for the narrow field of the strip lens can be extended simply by adding more lens units to the strip lens array while the overall object-to-image distance remains unchanged. In contrast, the overall conjugate of a scanner employing conventional optics must grow in proportion to the size of the field to be covered.

SUMMARY OF THE INVENTION

It is an object of this invention to provide an optical scanning system of the strip lens type which permits substantial reduction in the object-to-image distance.

Another object of this invention is to provide an optical scanning system of the strip lens type requiring only a single set of lenses.

Briefly, this invention is practiced in one form by a single array of image forming lenses between object and image surfaces in a photocopying environment. Each lens element is a half-lens with an associated mirror which folds the optical axis back through the lens. The mirror is a roof mirror to effect 180° rotation of the image which, added to the 180° image rotation, effected by the lens results in an upright image.

For a better understanding of this invention, reference is made to the following detailed description given in connection with the accompanying drawing.

DRAWING

FIG. 1 is an optical diagram of one imaging element of a prior art strip lens system.

FIG. 2 is an optical diagram (side view) of a single imaging element of a strip lens arrangement according to this invention.

FIG. 3 is a top view of the schematic arrangement shown in FIG. 2.

DESCRIPTION

With reference now to FIG. 1, a prior art strip lens imaging element is represented and includes an objective lens 2, a field lens 4, and an erector lens 6, all disposed in optical alignment between an object plane 8 and an image plane 10. The lens elements shown are each part of a linear or two-dimensional array and are mounted in a suitable support structure (not shown) as an integral whole. In this prior art strip lens imaging system, the objective lens 2 forms an image 14 of an original object 12 in the plane of the field lens 4. This intermediate or aerial image 14 is reimaged and erected at 16 on image plane 10 by the erector lens 6. As will be appreciated, a two-dimensional array of such lenses between two-dimensional object and image planes will create an upright ordered two-dimensional image of the original at the image plane 10.

Referring now to FIG. 2, an object plane is represented at 18 and an image surface, for example, a xerographic drum, at 20. A single imaging element of a strip lens structure according to this invention is shown at 22 disposed between object plane 18 and image surface 20, on an optical axis 24. Imaging element 22 includes a half-lens 26 and a reflector 28 immediately adjacent the lens element 26. Reflector 28 is a roof prism or roof mirror, the edge of which is perpendicular to the axis of the lens element 26. A first reflex mirror 30 deflects the optical axis 24 between object plane 18 and imaging element 22, and a second reflex mirror 32 deflects the optical axis 24 between the imaging element 22 and the image surface 20. Object and image are represented at 34 and 36, respectively.

In FIG. 3, the imaging system of FIG. 2 is shown as if viewed from the top in FIG. 2. Reflex mirror 30 and, directly beneath it, mirror 32 are shown, between which light rays represented at 38 propagate to and from the imaging elements 22. In this view, a plurality of imaging elements 22 is shown as being part of a larger linear array of such elements in a strip lens arrangement.

The imaging system of FIGS. 2 and 3 operates to project an upright ordered image 36 of the object 34 onto the image surface 20. Light rays 38 propagating between object and image traverse the lens element 26 twice because of the reflector 28 so that the half-lens element 26 is the equivalent of a full imaging lens. As such, the lens functions to rotate its image 180° relative to the object. Where an erector lens has normally been required to rotate the image another 180°, this function is performed in the present case by the roof mirror 28.

By the combination of roof mirror 28 with half-lens 26, an erector lens is not necessary in this system, and without an erector lens, a field lens is not required. Thus, by means of this invention, two of the three lenses heretofore required in a strip lens imaging system are eliminated.

The foregoing description of an embodiment of this invention is given by way of illustration and not of limitation. The concept and scope of the invention are limited only by the following claims and equivalents thereof which may occur to others as skilled in the art.

What is claimed is:

1. An optical imaging system for projecting images from an object surface to an image surface including:
   a plurality of optical imaging devices arranged between said surface,
   each of said imaging devices being disposed on a folded optical axis and including a projection lens element and a roof reflector adjacent to said projection lens element to fold said optical axis back through said projection lens element so that light propagating from said object surface to said projection lens element and said roof reflector is reflected back through said projection lens element to said image surface, said projection lens element being thus twice traversed by said propagating light and effective to project an image from said object surface onto said image surface,
   whereby an upright ordered composite image of said object surface is projected onto said image surface by said plurality of optical imaging devices.

2. An optical imaging system as defined in claim 1 wherein said roof reflector is a prism.

3. An optical imaging system as defined in claim 1 wherein said roof reflector is a mirror combination.

4. An optical imaging system as defined in claim 1 in which said projection lens element and said roof reflector are integrally connected.

5. An optical imaging system as defined in claim 1 in which said roof reflector is oriented with its roof edge substantially perpendicular to and intersecting with said optical axis.

6. An optical imaging system for projecting images from an object surface to an image surface including:
   a plurality of optical imaging devices arranged between said surfaces,
   each of said imaging devices being disposed on a folded optical axis and including a first reflex mirror to fold said optical axis, a projection lens element, a roof reflector adjacent to said projection lens element to fold said optical axis back through said projection lens element so that light propagating from said object surface to said projection lens element and said roof reflector is reflected back through said projection lens element to said image surface, and a second reflex mirror to fold said optical axis,
   said first reflex mirror directing light from said object surface to said projection lens element and said roof reflector,
   said roof reflector directing light back through said projection lens element to said second reflex mirror,
   said second reflex mirror directing light from said projection lens element to said image surface,
   said projection lens element being thus twice traversed by said propagating light and effective to project an image from said object surface onto said image surface, whereby an upright ordered composite image of said object surface is projected onto said image surface by said plurality of optical imaging devices.

7. An optical imaging system as defined in claim 6 in which said roof reflector is oriented with its roof edge substantially perpendicular to and intersecting with said optical axis.

* * * * *